(12) United States Patent
Shoji et al.

(10) Patent No.: US 10,837,560 B2
(45) Date of Patent: Nov. 17, 2020

(54) METHOD OF MANUFACTURING THERMO VALVE AND THERMO VALVE

(71) Applicant: YAMADA MANUFACTURING Co., Ltd., Kiryu (JP)

(72) Inventors: Kazuo Shoji, Kiryu (JP); Junichi Miyajima, Kiryu (JP); Soichi Yoshino, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 77 days.

(21) Appl. No.: 16/192,886

(22) Filed: Nov. 16, 2018

(65) Prior Publication Data

US 2019/0085984 A1    Mar. 21, 2019

Related U.S. Application Data

(62) Division of application No. 15/793,215, filed on Oct. 25, 2017, now Pat. No. 10,288,177.

(30) Foreign Application Priority Data

Nov. 28, 2016 (JP) ................................ 2016-230066
Nov. 28, 2016 (JP) ................................ 2016-230067
(Continued)

(51) Int. Cl.
*F16K 11/07* (2006.01)
*F16K 31/00* (2006.01)
(Continued)

(52) U.S. Cl.
CPC ............... *F16K 1/54* (2013.01); *F01M 5/005* (2013.01); *F01M 5/007* (2013.01); *F03G 7/06* (2013.01);
(Continued)

(58) Field of Classification Search
CPC .......... F16K 1/54; F16K 11/0716; F16K 1/32; F16K 1/04; F16K 1/126; F16K 31/002;
(Continued)

(56) References Cited

U.S. PATENT DOCUMENTS 3,917,163 A * 11/1975 Obermaier ............ F16K 31/002
236/34
10,288,176 B2 * 5/2019 Bertrand .................... F16K 1/12
(Continued)

FOREIGN PATENT DOCUMENTS

CN    102312998    1/2012
CN    205504143    8/2016
(Continued)

OTHER PUBLICATIONS

Chinese Office Action dated Apr. 3, 2020, 19 pages.

*Primary Examiner* — Marina A Tietjen
(74) *Attorney, Agent, or Firm* — Rankin, Hill & Clark LLP

(57) ABSTRACT

A method of manufacturing a thermo valve includes an overlaying step of overlaying a valve body onto a thermo actuator so as to cover a groove portion; and a caulking step of caulking an installing portion of the valve body onto the thermo actuator. The caulking step is performed by pressing, by use of a jig, the valve body and the thermo actuator toward an axis center in a radial direction. A pressing face of the jig has a short side portion and a long side portion longer than the short side portion. Pressing is performed with the long side portion being substantially in parallel to the axis center of the thermo actuator and the short side portion being substantially in parallel to the groove portion.

2 Claims, 6 Drawing Sheets

US 10,837,560 B2

Page 2

(30) Foreign Application Priority Data

Feb. 1, 2017 (JP) .................................. 2017-016734
Jul. 11, 2017 (JP) .................................. 2017-135220

(51) Int. Cl.
*F03G 7/06* (2006.01)
*F01M 5/00* (2006.01)
*G05D 23/02* (2006.01)
*F16K 1/54* (2006.01)
*F16K 1/04* (2006.01)
*F16K 1/12* (2006.01)
*F04C 2/10* (2006.01)
*F01M 1/16* (2006.01)
*G05D 23/13* (2006.01)
*G05D 23/275* (2006.01)
*G05D 23/30* (2006.01)

(52) U.S. Cl.
CPC .............. *F16K 1/04* (2013.01); *F16K 1/126* (2013.01); *F16K 11/0716* (2013.01); *F16K 31/002* (2013.01); *G05D 23/022* (2013.01); *F01M 1/16* (2013.01); *F04C 2/102* (2013.01); *F16N 2200/10* (2013.01); *F16N 2270/56* (2013.01); *F16N 2280/00* (2013.01); *G05D 23/1366* (2013.01); *G05D 23/27543* (2013.01); *G05D 23/303* (2013.01)

(58) Field of Classification Search
CPC .......... F01M 5/007; F01M 1/16; F01M 5/005; G05D 23/022; G05D 23/1366; G05D 23/27543; G05D 23/303; F04C 2/102; F16N 2200/10; F16N 2270/56; F16N 2280/00; B23P 19/02; F03G 7/06
See application file for complete search history.

(56) References Cited

U.S. PATENT DOCUMENTS

2006/0237672 A1* 10/2006 Moreno .............. F16K 31/0655
251/129.02
2006/0255308 A1* 11/2006 Weissinger ............ F16K 1/485
251/356

FOREIGN PATENT DOCUMENTS

| JP | 10-252913 | 9/1998 |
| JP | 4076244 | 4/2008 |

* cited by examiner

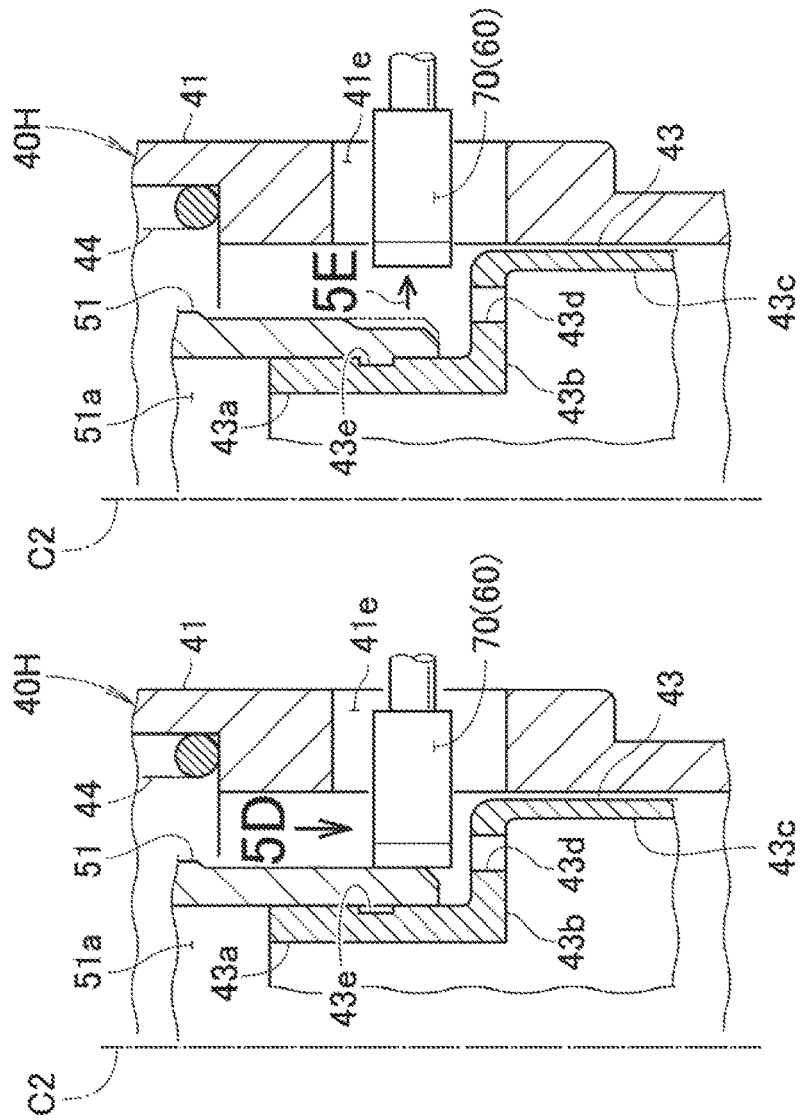
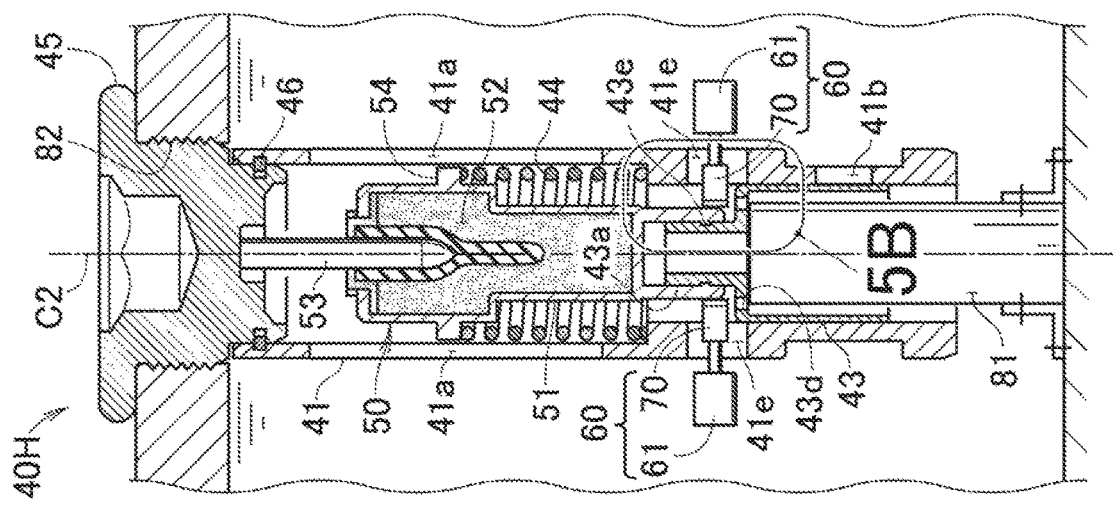

METHOD OF MANUFACTURING THERMO VALVE AND THERMO VALVE

FIELD OF THE INVENTION

The present invention relates to a thermo valve that controls flow rate in accordance with temperature of fluid.

BACKGROUND OF THE INVENTION

A valve is arranged in a flow passage in order to control the flow rate of fluid. One of prior art references pertaining to this kind of valve is a technique disclosed in Japanese Patent Application Laid-open Publication (Kokai) No. Hei 10-252913 A.

A valve such as the one disclosed in Japanese Patent Application Laid-open Publication (Kokai) No. Hei 10-252913 A includes a spool having a cylindrical shape, a valve seat press being fitted into the spool and then caulked, and a valve body provided to be capable of abutting the valve seat.

The valve seat has a groove formed in an outer circumference thereof toward an axis line. After the valve seat is press fitted into the spool, the spool is pressed toward the groove. It makes it possible that a part of the spool is pressed into an inside of the groove. In other words, the valve seat is caulked by the spool. By caulking after press fitting, it makes it possible to secure those components to each other more rigidly.

SUMMARY OF THE INVENTION

In the meantime, as one of those kinds of valves, a thermo valve that controls the flow rate in accordance with the temperature of the fluid has been known. The thermo vale is constituted by fastening the valve body to, for example, a thermo actuator which is actuated in accordance with the temperature of the fluid. In this kind of thermo valve, there is a demand to suppress the valve body from separating from the thermo actuator.

One object of the present invention is to provide a technique that is capable of securing the valve body to the thermo actuator in a rigid manner.

According to one aspect of the present invention, there is provided a method of manufacturing a thermo valve. The thermo valve is configured to control flow rate of fluid by a valve body, and the valve body is coupled to a thermo actuator having a rod actuated in accordance with temperature of the fluid.

The method comprising: a preparation step of preparing a thermo actuator and a valve body, at least either of the thermo actuator the valve body having a groove portion formed along a circumferential direction thereof; an overlaying step of overlaying the valve body onto the thermo actuator so as to cover the groove portion; and a caulking step of caulking an overlaid portion of the valve body onto the thermo actuator.

The caulking step is performed by pressing, by use of a jig, the valve body and the thermo actuator from outside thereof in a radial direction toward an axis center.

A pressing face of the jig has a short side portion and a long side portion longer than the short side portion.

Pressing is performed with the long side portion being substantially in parallel to an axis center of the thermo actuator and the short side portion being substantially in parallel to the groove portion.

According to the present invention, the caulking step is performed by pressing the valve body and the thermo actuator with the long side portion of the jig being substantially in parallel to the axis center of the thermo actuator and the short side portion of the jig being substantially in parallel to the groove portion. It has been turned out that, in comparison with the case in which the short side portion of the jig is substantially in parallel to the axis center of the thermo actuator and the long side portion of the jig is overlaid onto the groove portion, it makes it possible to fasten the valve body to the thermo actuator more rigidly. When pressing with the same pressing force, an area of the pressing face facing the groove portion is smaller so that a pressing force per unit area becomes higher.

For this reason, it can be assumed that an engagement amount or intrusion into the groove portion becomes larger so as to secure more rigidly. As the groove edge is substantially orthogonal to the jig, it makes it possible to enlarge a deformation volume at the groove edge portion.

BRIEF DESCRIPTION OF THE DRAWINGS

Hereinafter, some exemplary embodiments of the present invention will be described in detail with reference to the accompanying drawings, in which:

FIG. 5A is a view illustrating a caulking step shown in FIGS. 3A and 3B;

FIG. 5B is a partially enlarged view of 5B shown in FIG. 5A;

FIG. 5C is a view illustrating a state in which an actuator body as shown in FIG. 5B is caulked;

FIG. 5D is an arrow view of 5D as shown in FIG. 5B;

FIG. 5E is an arrow view of 5E as shown in FIG. 5C; and

DETAILED DESCRIPTION OF THE PREFERRED EMBODIMENTS

Figure 1:
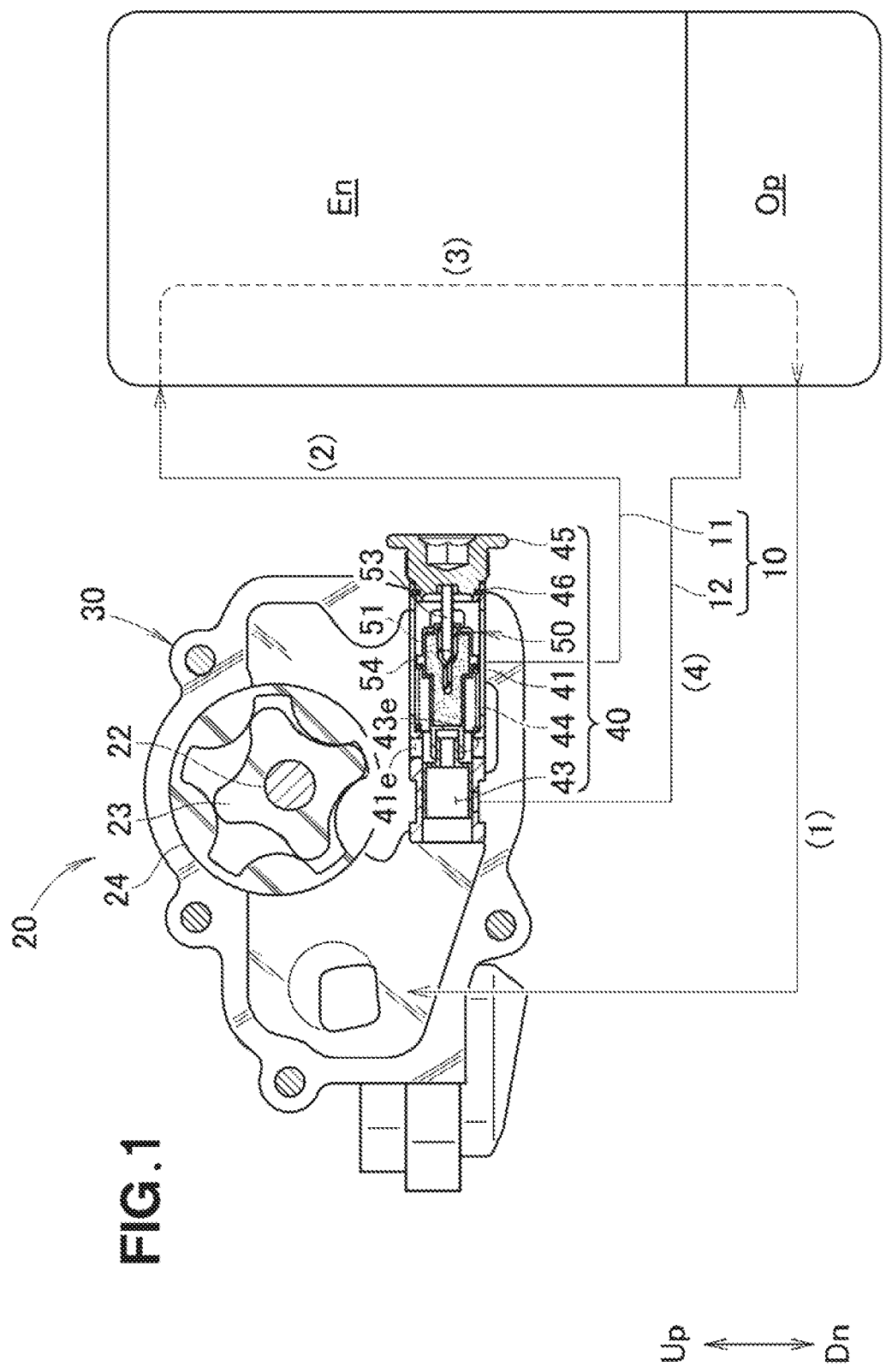
FIG. 1 is a schematic view illustrating an exemplary oil fluid passage in which a thermo valve according to an embodiment of the present invention is employed.

Hereinafter, embodiments of the present invention will be described with reference to the accompanying drawings. In the description, the terms "up," "down," "right" and "left" indicate the up, down, right, and left directions within the drawings. In addition, in the drawings, "Up" represents upward, and "Dn" represents downward.

Embodiment

Referring to FIG. 1, an oil pump 20 is used in an oil flow passage 10. For example, the oil flow passage 10 is a flow passage that connects an oil pan Op to the oil pump 20 and connects the oil pump 20 to an engine En so as to allow oil to circulate therein.

The oil flow passage 10 includes a main flow passage 11 and a bypass flow passage 12 that bypasses a portion of the main flow passage 11.

The oil pump 20 is a so-called internal gear pump. The oil pump 20 includes a housing 30, a rotating shaft portion 22 that is disposed in the housing 30 and configured to rotate as the engine En operates, an inner rotor 23 that is disposed in the housing and configured to be rotated by the rotating shaft portion 22, an outer rotor 24 that is disposed in the housing to enclose the circumference of the inner rotor 23 and configured to be rotated by the inner rotor 23, and a thermo valve 40 that is disposed in the housing and configured to be actuated in accordance with the temperature of the oil.

The rotating shaft portion 22 is connected to, for example, a crankshaft. The rotating shaft portion 22 can be connected to a desired member, such as a camshaft, aside from the crankshaft. In other words, an external driving source is not limited to a crankshaft.

The thermo valve 40 is disposed along a horizontal axis underneath the lower end of the outer rotor 24. An end portion of the thermo valve 40 is located underneath the rotating shaft portion 22 as viewed from the front. It should be noted that the expression "as viewed from the front" refers to a view in which the oil pump 20 is viewed along the axial direction of the rotating shaft portion 22.

Figure 2:
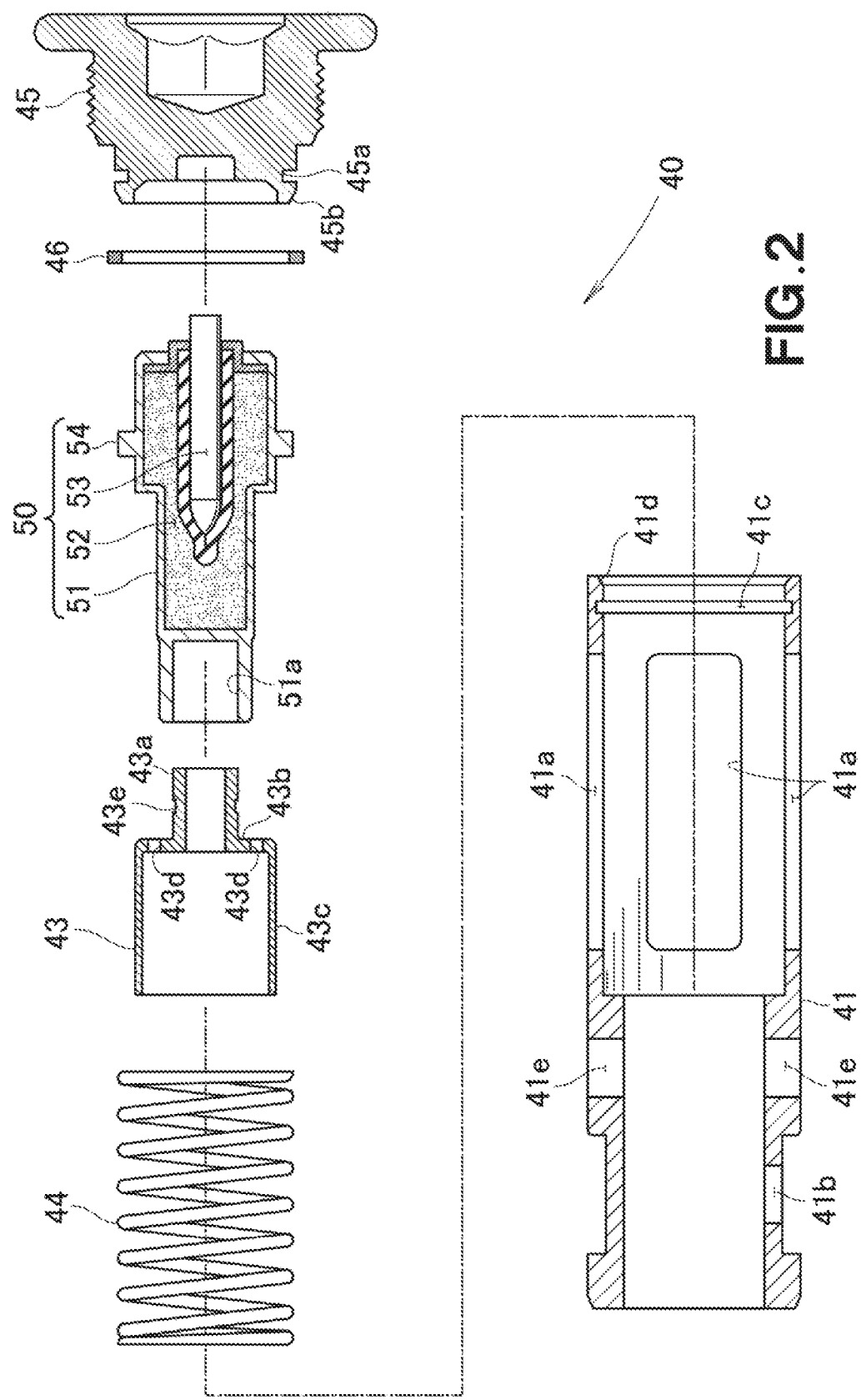
FIG. 2 is an exploded view illustrating the thermo valve shown in FIG. 1.
Figure 3A:
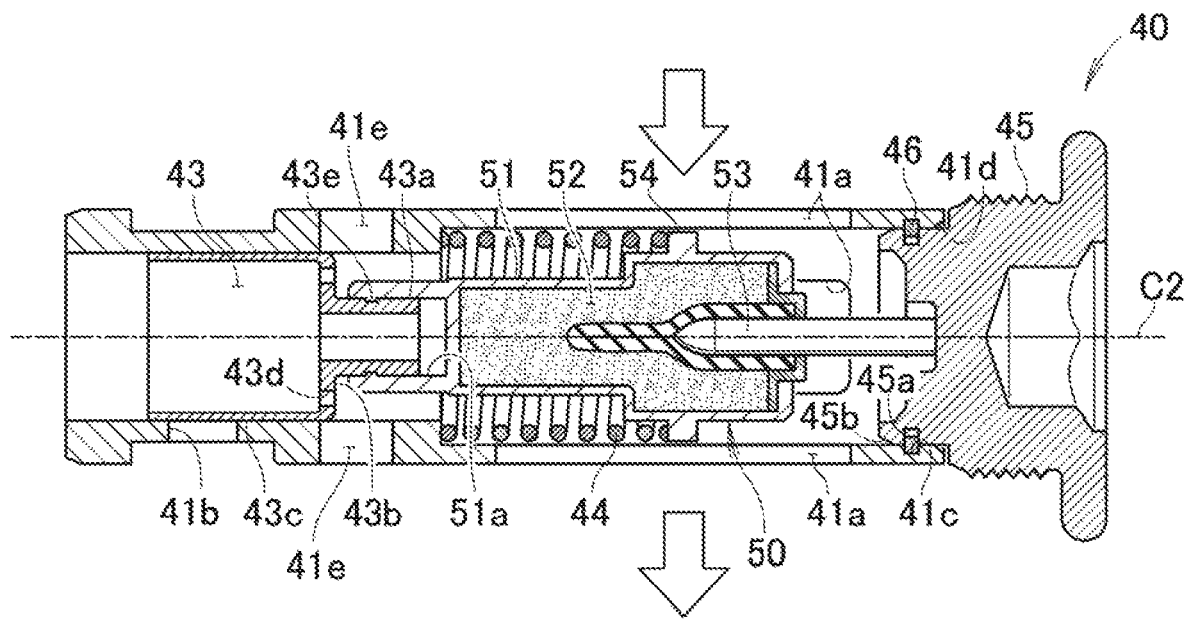
FIG. 3A is a view illustrating an action when oil at high temperature flows at a circumferential edge of the thermo valve shown in FIG. 2.

FIG. 2 and FIG. 3A are referred to. FIG. 3A illustrates the thermo valve 40 when the temperature of the oil is high. The thermo valve 40 includes a thermo actuator 50 that is actuated in accordance with the temperature of the oil, a valve body 43 that is fastened to the thermo actuator 50, a return spring 44 that biases the thermo actuator 50 and the valve body 43 in a returning direction, and a substantially cylindrical case 41 that houses the thermo actuator 50, the valve body 43, and the return spring 44. One end of the case 41 is closed by an actuator lid portion 45. The actuator lid portion 45 is prevented from coming off the case 41 by a C-shaped retaining ring 46 interposed between the actuator lid portion 45 and the case 41.

The case 41 includes two or four window portions 41a formed in the outer circumference of the thermo actuator 50, a case hole portion 41b that is opened and closed by the valve body 43, a retaining ring receiving groove 41c in which the C-shaped retaining ring 46 is received, and a female tapered portion 41d having a tip-widening shape that is formed at a front edge side from the retaining ring receiving groove 41c. The window portions 41a constantly allow the oil to pass therethrough while the oil is circulating. The portion of the case 41 in which the case hole portion 41b is formed and therearound is formed to be thinner across the entire circumference in the circumferential direction as compared to other portions thereof so that the outer diameter of that portion is smaller than the outer diameter of the remaining portion. As a result, the oil can be discharged smoothly regardless of the phase of the case hole portion 41b.

The thermo actuator 50 includes an actuator body 51, a wax 52 that is charged in a hole formed at one end of the actuator body 51 and that expands as the temperature rises, a rod 53 that is extruded from the actuator body 51 as the wax 52 expands, and a large-diameter portion 54 that projects from the actuator body 51 outward in the radial direction. The large-diameter portion 54 receives an end portion of the return spring 44 and functions as a spring bearing seat.

The valve body 43 includes a valve small-diameter portion 43a that is inserted and fastened into a hole 51a formed in another end of the actuator body 51, a valve step portion 43b that extends from an end portion of the valve small-diameter portion 43a toward the outer circumference, and a valve large-diameter portion 43c that extends from the outer end portion of the valve step portion 43b and that has a diameter larger than that of the valve small-diameter portion 43a. It should be noted that the valve body 43 may be fastened to the rod 53.

The valve step portion 43b has an oil passing hole portion 43d through which the oil can pass. Referring to FIG. 2 in particular, a groove portion 43e is formed in the valve small-diameter portion 43a. In addition, a through-hole is formed in the valve small-diameter portion 43a, penetrating its center along the axis. This allows the valve body 43 to be inserted into the hole 51a easily with little resistance of the air.

A front end portion of the actuator body 51, which is caulked, penetrates into the groove portion 43e. The groove portion 43e may be also referred to as a portion of a fastening portion that is a portion in which the valve body 43 is fastened to the thermo actuator 50. Hereinafter, the "groove portion 43e" may be referred to as "fastening portion 43e" as appropriate.

It should be noted that the groove portion 43e may be formed in the inner circumference of the actuator body 51. In addition, the front end of the actuator body 51 may be inserted into the inner circumference of the valve small-diameter portion 43a. In this case, the groove portion 43e is formed in the inner circumference of the valve small-diameter portion 43a or in the outer circumference of the actuator body 51.

The actuator lid portion 45 includes, at the front edge portion thereof (the lower end portion in the drawings), a retaining ring receiving groove 45a that receives the C-shaped retaining ring 46, and a male tapered portion 45b having a tip-sharpened shape that is formed at a front edge side from the retaining ring receiving groove 41c.

The outer diameter of the valve large-diameter portion 43c is slightly smaller than the inner diameter of the case 41. The inner diameter of the case 41 is larger at the circumferential edge of the large-diameter portion 54 and smaller at the circumferential edge of the valve body 43. The portion that connects the two different diameters is formed in a stepped shape and receives the end portion of the return spring 44 to function as a spring bearing seat.

Hereinafter, the operation of the oil pump 20 will be described in detail.

Referring to FIG. 1, the oil pump 20 operates as the engine En operates. When the oil pump 20 operates, the oil that has accumulated in the oil pan Op flows toward the oil pump 20, as indicated by the arrow (1). Then, the oil passes through the inner rotor 23 and the outer rotor 24 and is discharged to the outside of the oil pump 20. The discharged oil is caused to return to the engine En, as indicated by the arrow (2). Then, the oil that has circulated in the engine En accumulates in the oil pan Op, as indicated by the arrow (3).

Referring also to FIG. 3A, the wax 52 expands when the temperature of the oil is high. As the wax 52 expands, the rod 53 receives the force in the direction in which the rod 53 goes out from the actuator body 51. However, the front end of the rod 53 is in contact with the actuator lid portion 45, and thus the rod 53 is prevented from moving forward. Therefore, the actuator body 51 is relatively retracted toward the left side of the figure against the biasing force of the return spring 44. In other words, the forward movement of the rod 53 refers to its movement relative to the actuator body 51. When the rod 53 has moved forward (the actuator body 51 is being retracted), the valve body 43 covers the case hole portion 41b. Therefore, the oil passes only through the window portions 41a. Thus, the oil flows only in the main flow passage 11 and does not flow into the bypass flow passage 12.

Figure 3B:
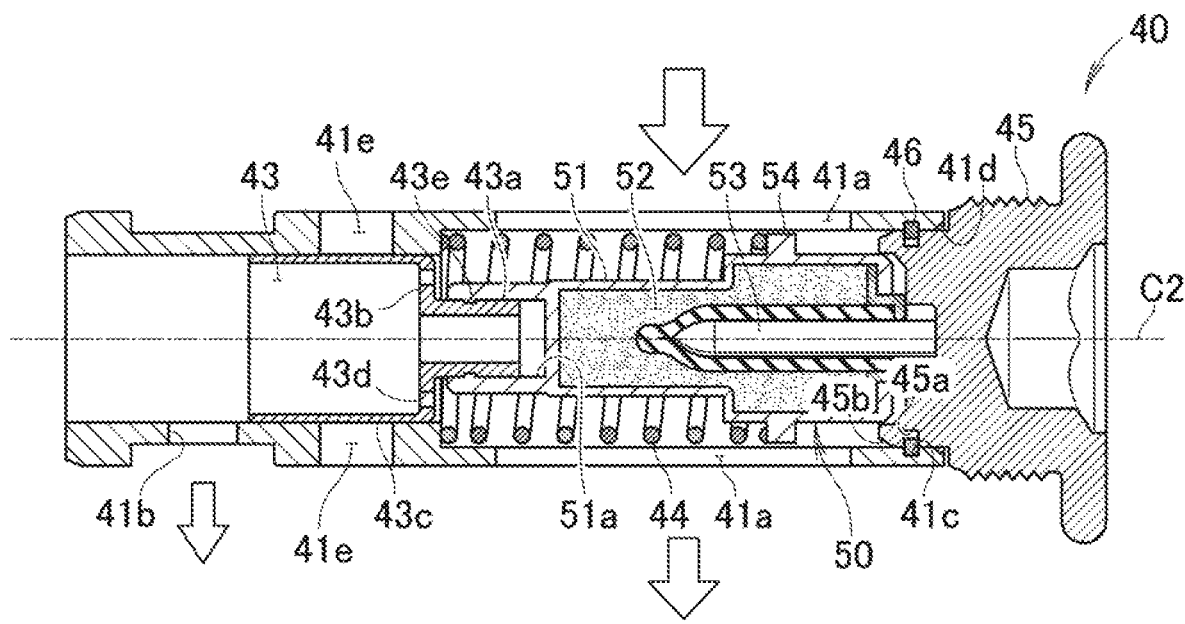
FIG. 3B is a view illustrating an action when oil at low temperature flows at the circumferential edge of the thermo valve shown in FIG. 2.

FIG. 1 and FIG. 3B are now referred to. FIG. 3B illustrates the thermo valve 40 when the temperature of the oil is low. The temperature of the oil is low, for example, immediately after the engine is started. When the temperature of the oil is low, the wax 52 is being contracted. Due to the biasing force of the return spring 44, the actuator body 51 receives the force in the direction toward the right side of the figure. As a result, the amount by which the rod 53 projects from the actuator body 51 is reduced. In other words, the rod 53 is being more retracted when the temperature of the oil is low than when the temperature of the oil is high. As a result, the valve body 43 releases the case hole portion 41b.

When the case hole portion 41b is in a released condition, a portion of the oil flows between the return spring 44 and the actuator body 51 and passes through the oil passing hole portion 43d. The oil that has passed through the oil passing hole portion 43d is caused to return to the oil pan Op via the bypass flow passage 12, as indicated by the arrow (4) in FIG. 1. In other words, some of the oil is not caused to return to the engine En. For this reason, it makes it possible that the flow rate of the oil that passes through the main flow passage 11 is reduced, and the rise in the oil pressure in the engine En can be suppressed.

Hereinafter, a method of manufacturing the thermo valve 40 will be described in detail.

Referring to FIG. 2, the case 41, the thermo actuator 50, the valve body 43, the return spring 44, the actuator lid portion 45, and the C-shaped retaining ring 46 are prepared (preparation step).

Subsequently, the returning spring 44 and the thermo actuator 50 are housed in the case 41 (housing step). It should be noted that, subsequent to the housing step, it is possible to manufacturing the thermo valve 40 even when a performing order of the subsequent steps changes more or less.

Yet subsequently, the actuator lid portion 45 is installed to one end of the case 41 in which the returning spring 44 and the thermo actuator 50 have been housed (lid body installation step).

The lid body installation step will be further described in detail. The C-shaped retaining ring 46 is pushed in along the male tapered portion 45b. The diameter of the C-shaped retaining ring 46 is expanded by the male tapered portion 45b. When the C-shaped retaining ring is further being pushed in, the C-shaped retaining ring 46 is fitted into the retaining ring receiving groove 45a. Next, when the actuator lid portion 45 is tried to be inserted into the case 41, then the diameter of the C-shaped retaining ring 46 is reduced by the female tapered portion 41d. When the C-shaped retaining ring is yet further being pushed in, then the C-shaped retaining ring 46 is fitted into the retaining ring receiving groove 41c. As a result, the actuator lid portion 45 is secured at the end portion of the case 41.

Figure 4C:
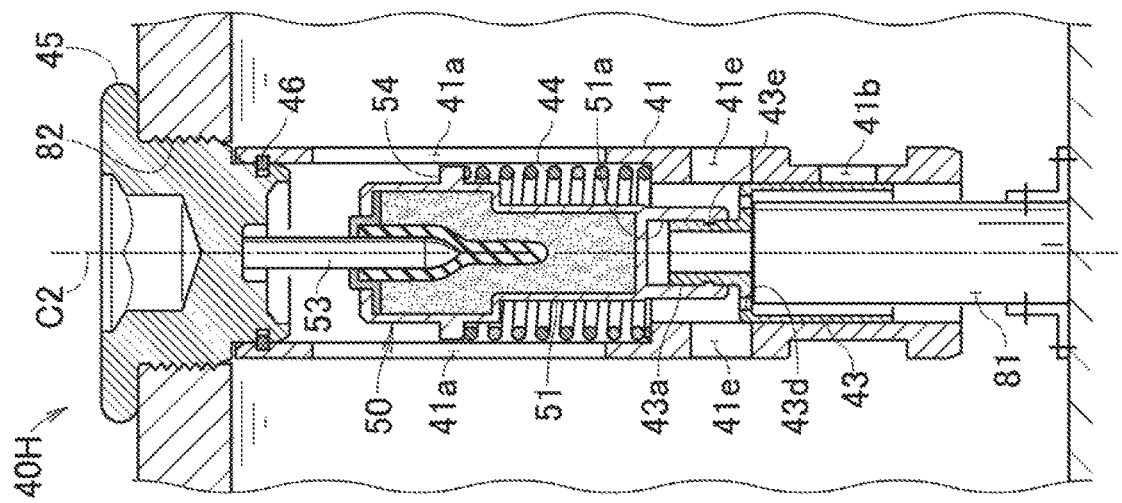
FIG. 4C is a view illustrating an overlaying step of the thermo valve shown in FIGS. 3A and 3B.
Figure 4B:
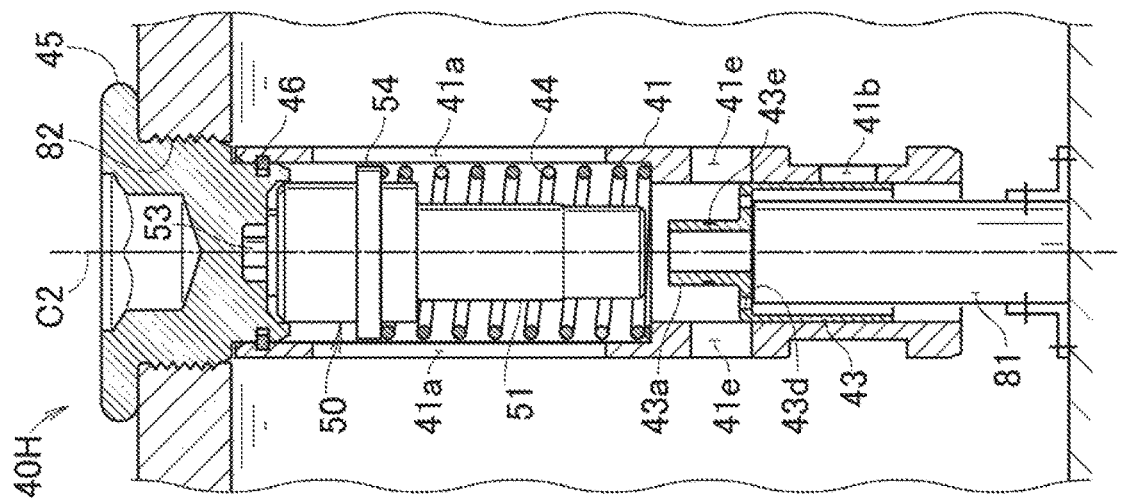
FIG. 4B is a view illustrating a thermos actuator actuating step of the thermo valve shown in FIGS. 3A and 3B.
Figure 4A:
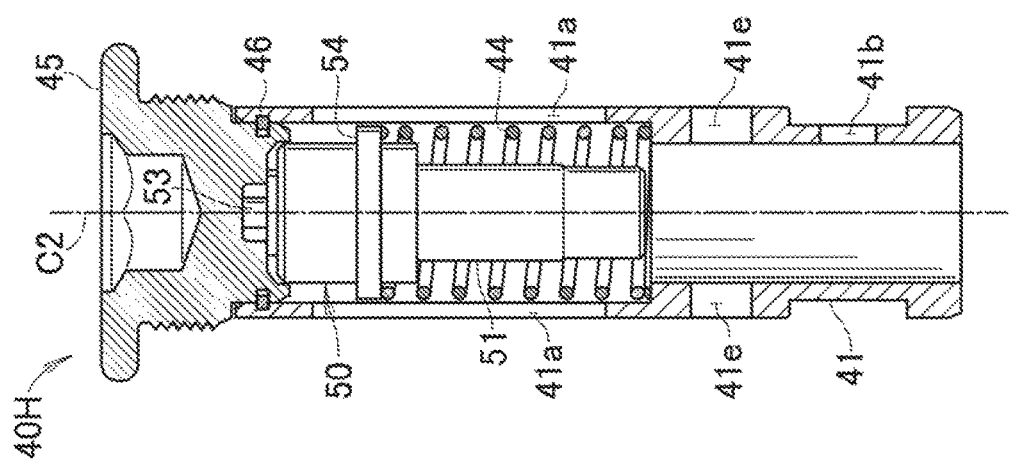
FIG. 4A is a view illustrating a housing step of the thermo valve shown in FIGS. 3A and 3B.

FIG. 4A is now referred to. By performing the above mentioned cover lid installation step, a subassembly 40H can be obtained.

FIG. 4B is now referred to. The valve body 43 and the subassembly 40H are set in an oil tank filled with the oil at the predetermined temperature (for example, 80 degrees Celsius). The valve body 43 is supported by a valve body supporting portion 81 provided inside the oil tank. The subassembly 40H is secured to the female screw hole 82 formed in a lid body of the oil tank. The axis lines of the subassembly 40H, the valve body 43, the valve body supporting portion 81 and the female screw hole 82 coincide with one another (as shown in C2).

FIG. 4C is now referred to. After a period of time, the wax 52 is expanded in accordance with the oil temperature so as to push down the actuator body 51 against the biasing force of the returning sprint 44. In other words, the subassembly 40H is placed in an atmosphere at a predetermined temperature, and the thermo actuator 50 is actuated (thermo actuator actuating step).

With the actuator body 51 being pushed down, the valve body 43 is inserted into a hole 51a formed at a lower end of the actuator body 51. In other words, the valve body 43 is overlaid onto the thermo actuator 50, which has been actuated, from the other end of the case 41 (overlaying step).

The thermo actuator 50 is overlaid onto the valve body 43 so as to close the groove portion 43e. The thermo actuator 50 and the valve body 43 has a relationship that relatively displace from each other. When the thermo actuator 50 is assumed to be referential, it can be said that the valve body 43 is overlaid onto the thermo actuator 50 so as to close the groove portion 43e. In other words, the valve body 43 is inserted into the actuator body 51 up to a position overlaying the groove portion 43e.

At this moment, a front end of the valve body 43 is not in contact with a bottom face of the hole 51a. In other words, in the overlaying step, the front end of the valve body 43 has a gap with respect to the bottom face of the hole 51a. The hole 51a is formed at a depth that approximately has a gap with respect to the front end of the valve body 43.

The valve body 43 can be overlaid onto the thermo actuator 50 in a state in which the thermo actuator is being actuated at a predetermined temperature. At this moment, the valve body 43 is placed at a predetermined position by the valve body supporting portion 81. The thermo actuator 50 is actuated with respect to the valve body 43 placed at a predetermined position so as to overlay the valve body 43 onto the thermos actuator 50. It is possible to absorb a dimension error that inevitably occurs in the valve body 43 and the thermo actuator 50. At the predetermined temperature, it is possible to allow the valve body 43 to constantly face to the same position. In other words, it can be said that the gap between the bottom face of the hole 51a and the front end of the valve body 43 is considered to be an adjustment margin for absorbing the dimension error.

FIG. 5A and FIG. 5B are now referred to. In order to fasten the valve body 43 to the thermo actuator 50, a jig 60 is caused to face to the vicinity of the groove portion 43e. As the thermo actuator 50 is in a state in operation, the groove portion 43e is being faced to a jig inserting hole 41e.

The jig 60 is constituted such that the actuator 61 supports a pressing member 70 for pressing the valve body 43 or the thermo actuator 50. The jig inserting hole 41e has a sufficient size to allow the pressing member 70 to pass therethrough.

FIG. 5D and FIG. 5E are now referred to. FIG. 5D is a 5D arrow view of FIG. 5B. Likewise, FIG. 5E is a 5E arrow view of FIG. 5C. A front end of the pressing member 70 serves as a pressing face 71 for pressing the actuator body 51 (as shown in FIG. 5B). The pressing face 71 exhibits a substantially rectangular shape, and has a short side portion 71a having the length of L1 and a long side portion 71b having the length of L2 that is longer than the short side portion 71a. It should be noted that the shape of the pressing face 71 is not limited to the rectangle but the pressing face 71 may have the short side portion and the long side portion each of which has a different length from each other.

FIG. 5B is now also referred to. The jig 60 is caused to face the outer circumference of the actuator body 51 such that the long side portion 71*b* is to be substantially parallel to the axis center C2 of the thermo actuator 50 and the short side portion 71*a* is overlaid onto or substantially parallel to the groove portion 43*e*.

FIG. 5C is now referred to. The actuator body 51 is pressed, by the pressing member 70, from the outer circumference toward the axis center C2. In other words, the valve body 43 and the thermo actuator 50 are pressed from the outside in the radial direction toward the axis center C2. The jig 60 is caused to be exposed from the jig inserting hole 41*e* so as to caulk an overlaid portion of the thermo actuator 50 and the valve body 43 (caulking step). The actuator body 51 is deformed and a portion thereof is inserted into the groove portion 43*e*. In this way, the valve body 43 is fastened to the thermo actuator 50. Ultimately, the thermo valve 40 is completely assembled (as shown in FIG. 3A).

Figure 6:
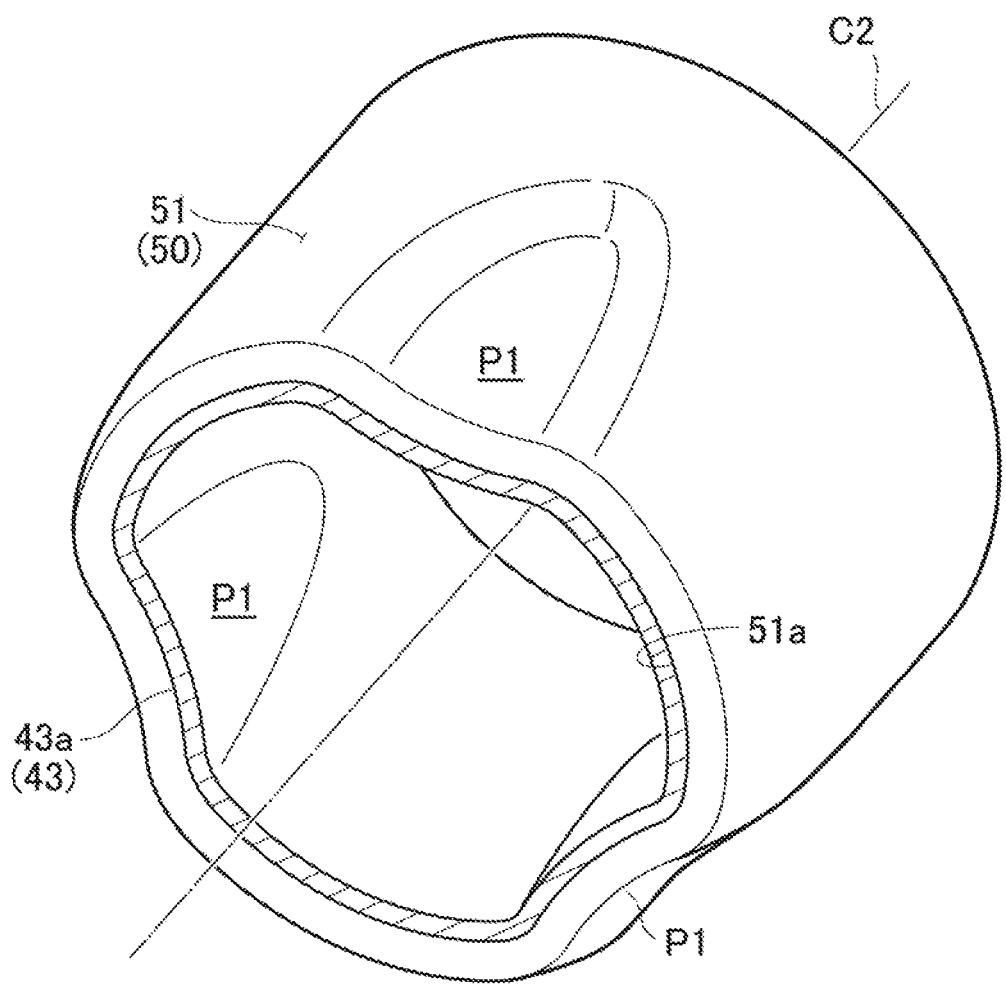
FIG. 6 is an enlarged view of a fastening portion shown in FIGS. 3A and 3B.

FIG. 6 is now also referred to. In the actuator body 51 and the valve body 43, the pressed portion P1 is slightly depressed (i.e., deformed) toward the axis center C2. For example, the pressed portions are three positions. As the long side portion 71*b* is directed to the direction along the axis center, the deforming portion (depression) P1 is also deformed to be in a shape along the axis center, in other words, a vertically long shape. Assuming that the long side portion 71*b* is pressed with the long side portion 71*b* being directed to be vertical to the axis center, then the long side portion 71*b* is considered to be deformed to be long in the circumferential direction. For this reason, it makes is possible to figure out toward which direction the pressing member 70 has been fastened.

The present invention described above can achieve the following effects.

FIG. 5B and FIG. 5E are now referred to. The caulking step is performed by pressing the actuator body 51 with the long side portion 71*b* of the jig 60 being substantially parallel to the axis center C2 of the thermo actuator 50 and the short side portion 71*a* thereof being overlaid onto or substantially parallel to the groove portion 43*e*. It has been turned out that the valve body 43 can be fastened to the thermo actuator 50 more rigidly as compared to the case in which the actuator body 51 is pressed with the short side portion 71*a* of the jig being substantially parallel to the axis center C2 of the thermo actuator 50 and the long side portion 71*b* thereof being overlaid onto the groove portion 43*e*. Assuming that the same pressing force is applied, when an area of the pressing face facing to the groove portion 43*e* is smaller, then the pressing force per unit area becomes higher. For this reason, it is considered that the intrusion or penetration amount into the groove portion 43*e* becomes larger so as to secure the valve body 43 to the thermo actuator 50 more rigidly. As an edge of the groove portion 43*e* is substantially orthogonal to the long side portion 71*b* of the jig 60, it makes it possible to enlarge the deformation amount at a groove edge portion.

FIG. 5A is now also referred to. In the overlaying step, the valve body 43 is overlaid onto the actuator body 51 of the thermo actuator 50. Subsequently, the valve body 43 is caulked to the actuator body 51. When the valve body 43 is secured to the rod 53, the rod 53 is considered to fall down due to the load exerted when being caulked. If the rod 53 falls down, then it prevents a smooth operation of the rod 53. On the other hand, the actuator body 51 has an outer diameter larger than that of the rod 53 as a matter of course. For this reason, the load exerted to respective portions is smaller when being caulked. As a result, the actuator 51 is less likely to be deformed due to the load exerted when being caulked as compared to the rod 53. In addition, the deformation of the actuator body 51 less affects the smooth operation of the rod 53 as compared to the case in which the rod 53 falls down. Accordingly, it makes it possible to provide a thermo valve 40 that is capable of operating more smoothly.

Furthermore, the actuator body 51 has a hole 51*a* formed to be depressed along the axis direction at the end portion thereof. The groove portion 43*e* is formed on the outer circumference of the valve body 43. The front end of the valve body 43 is inserted into the hole 51*a*. By employing a structure in which the valve body 43 is inserted into the hole 51*a* formed in the actuator body 51, it makes it possible to keep an entire length of the thermo valve 40 to be short. Yet furthermore, the groove portion 43*e* is formed on the outer circumference of the valve body 43. Thus, it makes it possible to make the fabrication easier as compared to the case in which the groove portion is formed on an inner circumference of the hole 51*a* of the actuator body 51.

FIG. 5A is now referred to. The case 41 has a jig inserting hole 41*e* that faces to a fastening portion 43*e* of the thermo actuator 50 and the valve body 43 when the rod 53 of the thermo actuator moves forward. When the thermo valve 40 is assembled, by setting the atmosphere to be at the predetermined temperature in advance, it makes it possible to actuate the thermo actuator 50. By installing the valve body 43 to the thermo actuator 50 in this state, it makes it possible to absorb the dimension error that the thermo actuator 50 and the valve body 43 have individually. After then, it makes it possible that the jig 60 is inserted from the jig inserting hole 41*e* so as to fasten the valve body 43 to the thermo actuator 50. As a result, it makes it possible to accurately control an opening degree of the valve at the predetermined temperature. In other words, it makes it possible to provide the thermo valve 40 to which the valve body 43 is attached at a precise position of the thermo actuator 50.

The above observation can be alternatively described as follows. After the thermo actuator 50 is actuated in the atmosphere at the predetermined temperature, the jig 60 is caused to expose from the jig inserting hole 41*e* so as to caulk the overlaid portion of the thermo actuator 50 and the valve body 43. By setting the atmosphere to be at the predetermined temperature in advance, it makes it possible to attach the valve body 43 while the thermo actuator 50 is being actuated. Also, by fine adjusting the installation position of the valve body 43 to the thermo actuator 50, it makes it possible to absorb the dimension error that the thermo actuator 50 and the valve body 43 have individually. As a result, it makes it possible to accurately control the opening degree of the valve at the predetermined temperature. In other words, it makes it possible to provide the thermo valve 40 to which the valve body 43 is attached at a precise position of the thermo actuator 50.

It should be noted that, although the thermo valve according to the present invention has been described with reference to a particular example in which the thermo valve is used for the oil pump, the thermo valve may be mounted to other devices and not limited to those described.

In addition, although the thermo valve has been described with reference to a particular example in which the bypass flow passage is closed at the high temperature, the thermo valve may close the bypass flow passage at the low temperature.

Yet in addition, although the thermo valve has been described with reference to a particular example having the case 41, it is possible to attach the valve body at a precise position even if the thermo actuator without the case 41 is employed. In this case, a case hole portion for discharging the oil may be provided at the oil flow passage 10 or the housing 30 instead of the case 41.

As described above, the present invention is not limited to those described in the above embodiment as long as the action and the effects can be achieved.

INDUSTRIAL APPLICABILITY

The method of manufacturing a thermo valve according to the present invention is preferable for a flow rate controlling valve which is used for an oil pump of a vehicle.

REFERENCE SIGNS LIST

40: Thermo Valve
40H: Subassembly
41: Case
41e: Jig Inserting Hole
43: Valve Body
43e: Groove Portion (Fastening Portion)
44: Returning Spring
45: Actuator Cover Portion
50: Thermo Actuator
51: Actuator Body
53: Rod

What is claimed is:

1. A thermo valve comprising:
   a thermo actuator having a proximal end and a distal end, wherein a rod extends from said proximal end and is actuated in accordance with change in temperature of fluid;
   a valve body fastened to the thermo actuator at a fastening portion and configured to control flow rate of the fluid, said valve body extending axially from the distal end of said thermo actuator; and
   a case that receives said thermo actuator and said valve body, said case having openings in a circumferential surface thereof that are opened or blocked by said valve body based upon fluid temperature;
   a returning spring configured to bias the thermo actuator and the valve body in a returning direction that is generally parallel to an axis center of said case,
   one of the thermo actuator and the valve body having a groove portion formed in a circumferential direction thereof,
   the thermo actuator and the valve body being overlaid onto each other along the axis center so as to cover the groove portion,
   the fastening portion being provided at least where the thermo actuator and the valve body are overlaid onto each other, and wherein, at the fastening portion, at least one of the valve body and the thermo actuator is deformed and part of the thermo actuator or the valve body extends into the groove portion, and
   the fastening portion has a vertically long shape along the axis center.

2. The thermo valve according to claim 1, wherein
   the thermo actuator has an actuator body configured to support the rod in a manner capable of moving forward and retreating, and
   the valve body being fastened to the actuator body.

* * * * *